United States Patent Office 2,997,450
Patented Aug. 22, 1961

2,997,450
PROCESS FOR THE PRODUCTION OF DULLED OR PIGMENT-CONTAINING POLYAMIDES
Horst Taul and Heinz Indest, Obernburg (Main), Germany, assignors to Vereinigte Glanzstoff-Fabriken A.G., Wuppertal-Elberfeld, Germany
No Drawing. Filed May 5, 1958, Ser. No. 732,836
Claims priority, application Germany May 8, 1957
11 Claims. (Cl. 260—37)

This invention in general relates to processes for the production of polyamide products containing pigments for coloring or delustering said products, wherein a very uniform distribution of the delustering agents or the pigments is achieved in the polyamide.

It is known that polyamide products can be finished by addition of titanium dioxide, lampblack or dye pigments. In filament spinning, it has been proposed that the polyamide spinning mass be combined with neutral substances, such as, for example, titanium dioxide in a very small quantity and the polycondensate obtained be spun. Titanium dioxide is here generally added as an aqueous suspension, known as titanium milk. Dull-colored or delustered threads or fibers are obtained. Difficulties do not arise in the addition of titanium dioxide to the previously polymerized, molten spinning mass with regard to the distribution of the pigment in the polycondensate. However, when relatively large quantities of titanium dioxide are incorporated into the highly polymerized substances, a uniform distribution becomes more difficult. Further, it has been proposed that the delustering of polyamides with pigments be carried out in such a way that particles of the polymeric spinning material is mixed with finely distributed delustering agents or pigments until the latter are uniformly distributed on the surface of the spinning material. Then the thus delustered product is further processed into threads in the molten spinning process. According to this latter process, the pigment or delustering agent is dispersed and so maintained by adhesion to the spinning material.

With reference to the addition of the delustering agent, titanium dioxide, to the polymerizable monomers, however, the distribution of this white pigment is not so simple due to the fact that the aqueous solution of the monomers acts on the titanium dioxide suspension as an electrolyte. As a result, the titanium dioxide flakes out of the suspension, and the greater part of the titanium dioxide settles on the bottom of the autoclave during the subsequent condensation polymerization—giving an unequal titanium dioxide distribution in the polymerized product. This phenomenon is principally a problem in the production of higher polyamide condensates from diamines and dicarboxylic acids or their salts, because these compounds are stronger electrolytes than are amino-carboxylic acids or lactams. In the production of polyamides either from amino-carboxylic acids or lactams, especially caprolactam, the flaking-out of the titanium dioxide is only observed to be especially strong when other electrolytes, for example, manganese acetate or copper acetate used as retardants against light and heat damage, have been added to the monomeric products. If, for example, polyamides are to be produced from dicarboxylic acids and diamines initially containing 2% titanium dioxide, there results, according to the processes heretofore known, a greatly unequal distribution of the titanium dioxide. This inequality can, for example, be observed upon extrusion of a ribbon of such a polyamide melt. In a specific instance, the distribution of the titanium dioxide was observed to be:

(a) At the beginning of the polyamide ribbon, 3.8% $TiO_2$;

(b) At the middle of the polyamide ribbon, 1.4% $TiO_2$;

(c) At the end of the polyamide ribbon, 0.8% $TiO_2$. This unequal distribution of the pigments in the polymeric compounds is also a problem in the addition of lampblack or colored dye pigments, such as phthalocyanine dye pigments.

In accordance with our invention, polyamides containing dye pigments or inorganic delustering agents such as $TiO_2$ are obtained with a uniform pigment distribution, when the polymerizable monomers which contain the coloring or delustering pigment to be dispersed is combined with a small quantity of aluminum phosphate, whereupon the monomer mixture is polycondensed in a usual manner. The quantity of aluminum phosphate employed will ordinarily be in the range of about 0.5 to 30%, preferably 1 to 10%, based on the quantity of delustering agent or dye pigment used. The process is especially suitable for the production of surface-delustered polyamides, where titanium oxide is used as the delustering agent. If, however, dye pigments are to be dispersed in the monomeric constituents prior to polymerization thereof, whereby a fine, uniform distribution of the pigment in the polymer results, then this process is also suitable for this purpose.

It is advantageous to use aluminum phosphate which, before its employment, is freshly precipitated with sodium phosphate from an aluminum salt. The addition of the aluminum phosphate is possible in various ways. It is possible to add dry or semidry aluminum phosphate to the aqueous solution or dispersion of the monomers, which contains the pigment in solid form. It is, however, advantageous to add the aluminum phosphate as an aqueous suspension to the starting products. The requisite quantity of aluminum phosphate depends on the amount of the pigment added and its own dispersion properties.

As monomers for the polyamide production, either lactams, especially caprolactam, amino carboxylic acids, or salts formed from diamines and dicarboxylic acids can be used, as, for example, hexamethylene diamine adipate.

The polyamides herein contemplated may be made from approximately equal molar mixtures of aliphatic diamines having primary amino groups and 4–8 carbons, preferably hexamethylene diamine, and aliphatic dicarboxy acids having 6–10 carbons and terminal carboxy groups, preferably adipic or sebacic acid. Alternatively, the polymerization may proceed from salts of the foregoing diamines and dicarboxy acids. The amino aliphatic monocarboxy acids, such as $\epsilon$-amino caproic acid, and lactams, such as caprolactam, though less troublesome unless other electrolytes are added thereto, are also contemplated as initial monomers for this invention.

The temperatures and pressures employed in the polycondensations may be those which are conventional in the art. They may be, for example, for aliphatic dicarboxy acid and aliphatic diamine mixtures, or salts thereof, within the general ranges of 150 to 300° C. and 1 mm. vacuum to 70 atm.; for amino aliphatic mono-carboxy acids, 150 to 300° C. and 2 mm. vacuum to 50 atm.; and for lactams, 150 to 300° C. and 2 mm. vacuum to 50 atm. It is recognized that these are broad ranges, but our invention is not particularly concerned with the details by which polycondensation is accomplished, but rather with the uniform, stable dispersion of the pigments in the monomers prior to polycondensation. The polymers ordinarily will be of a molecular weight in excess of 5,000.

In the production of highly delustered polyamides, in which about 2% with respect to the polyamide of titanium dioxide is added, it is possible, for example, to add 0.02 to 0.2% of aluminum phosphate, with reference to the quantity of polyamide, to the monomers. After the polycondensation, a polyamide ribbon is obtained which is uniform throughout, that is, at the beginning, the middle and at the end of the ribbon, there is a substantially constant titanium dioxide content of 2%. Insofar as a lower degree of delustering is desired, correspondingly less $TiO_2$ and aluminum phosphate should be used.

The invention is further illustrated in the following examples.

*Example I*

In an autoclave under a nitrogen atmosphere, 2,000 g. of a hexamethylene diamine-adipic acid salt are combined with 1% by weight, based on the weight of said salt, of $TiO_2$ and 15% by weight, on a dry basis and based on the weight of $TiO_2$, of moist, freshly precipitated aluminum phosphate. The mixture was heated to 212° C. for four hours at about 18 atmospheres gauge. Over a period of two additional hours, the steam is slowly released from the autoclave, and the temperature rises to 250° C. Then the polycondensation is completed at atmospheric pressure by a three hour heating at about 270° C. The molten polycondensate is extruded as a ribbon, which has a delustered appearance, and is quenched immediately in cold water. The titanium dioxide is observed to be uniformly distributed in the extruded ribbon.

*Example II*

Under a nitrogen atmosphere, equimolar amounts of hexamethylene diamine and adipic acid are added, together with about 0.5% acetic acid, to an autoclave. Also, 0.5% by weight, based on the weight of the diamine and acid, of titanium dioxide pigment is added together with 5% by weight, based on the titanium dioxide, of freshly precipitated aluminum phosphate. The autoclave contents are thoroughly mixed, and the mixture is heated and held at 280° C. for four hours at approximately atmospheric pressure. The steam formed during the condensation is allowed to escape. The polyamide is then extruded in ribbon form and quenched in cold water. The titanium dioxide distribution in the ribbon is observed to be substantially uniform.

In another run, sebacic acid is substituted for adipic acid, and the process is repeated.

*Example III*

Two hundred pounds of ε-aminocaproic acid, containing 1.5% by weight of titanium dioxide and 20% by weight, based on the titanium dioxide, of aluminum phosphate uniformly dispersed therein, is heated in an autoclave under a nitrogen atmosphere for 80 hours at 220° C. The polyamide thus formed is extruded as a continuous ribbon with the $TiO_2$ delustering agent uniformly dispersed therein.

*Example IV*

One hundred pounds of caprolactam, containing 0.5 lb. copper acetate, is thoroughly mixed with 2% by weight of titanium dioxide and 12% by weight, based on the titanium dioxide, of freshly precipitated aluminum phosphate. The mixture is then heated to 240° C. for 60 hours under a nitrogen blanket. The resulting polyamide is extruded in ribbon form with the $TiO_2$ pigment uniformly dispersed throughout the length of the ribbon.

*Example V*

The procedure of Example I is repeated with the exception that 0.5% by weight, based on the weight of the hexamethylene diamine-adipic acid salt, of carbon black is substituted for the titanium dioxide pigment and the aluminum phosphate content was 20% by weight of the carbon black.

*Example VI*

The procedure of Example II was repeated—substituting for the $TiO_2$ pigment a phthalocyanine dye pigment.

While the invention herein contemplated has proven to be particularly useful in the uniform distribution of titanium dioxide pigments in polyamide polymers, it is within the spirit of the invention to employ aluminum phosphate similarly to other pigmentary compounds which have a tendency to flake out in the presence of electrolytes. Further, the polyamides herein described in detail are those which have proven to be most suitable for the melt spinning of filaments—the invention thus being eminently suitable for the production of delustered nylon filaments. The flaking out problem is not limited only to these polymers, however, and hence the invention is also applicable to the preparation of other polymers wherein flaking out of the dispersed pigment is a problem.

Having thus described our invention, we claim:

1. A process for preparation of polyamide polymers containing pigments having a flaking out tendency in the presence of electrolytes which comprises dispersing a pigment selected from the group consisting of titanium dioxide, carbon black, and a phthalocyanine dye pigment in a monomeric composition which is polymerizable to form a polyamide condensation polymer, said monomeric composition selected from the group consisting of an approximately equimolar mixture of an aliphatic dicarboxylic acid, having 6–10 carbons and terminal carboxy groups and an aliphatic diamine having 4–8 carbons and primary amino groups, salts of said diamine and dicarboxy acid, amino aliphatic monocarboxy acids, and lactams, in the presence of 0.5–30% by weight, based on the pigment, of aluminum phosphate, and polymerizing the monomeric composition with the pigment and aluminum phosphate dispersed therein at polyamide-forming temperature and pressure.

2. A process for preparation of delustered polyamide polymers which comprises dispersing titanium dioxide pigment in an approximately equimolar mixture of hexamethylene diamine and adipic acid in the presence of 0.5–30% by weight, based on the titanium dioxide pigment, of aluminum phosphate, and polycondensing at polyamide-forming temperature the hexamethylene diamine and adipic acid with the titanium dioxide and aluminum phosphate uniformly dispersed therein.

3. A process for preparation of delustered polyamide polymers which comprises dispersing titanium dioxide pigment in an approximately equimolar mixture of hexamethylene diamine and sebacic acid in the presence of 0.5–30% by weight, based on the titanium dioxide pigment, of aluminum phosphate, and polycondensing at polyamide-forming temperature the hexamethylene diamine and sebacic acid with the titanium dioxide and aluminum phosphate uniformly dispersed therein.

4. A process for preparation of delustered polyamide polymers which comprises dispersing titanium dioxide pigment in a hexamethylene diamine-adipic acid salt in the presence of 0.5–30% by weight, based on the titanium dioxide pigment, of aluminum phosphate, and polycondensing at polyamide-forming temperature the hexamethylene diamine and adipic acid with the titanium dioxide and aluminum phosphate uniformly dispersed therein.

5. A process for preparation of delustered polyamide polymers which comprises dispersing titanium dioxide pigment in monomeric ε-aminocaproic acid in the presence of 0.5–30% by weight, based on the titanium dioxide pigment, of aluminum phosphate, and polycondensing at polyamide-forming temperature said amino acid with the titanium dioxide and aluminum phosphate uniformly dispersed therein.

6. A process for preparation of delustered polyamide polymers which comprises dispersing titanium dioxide pigment in ε-caprolactam containing an electrolyte and further in the presence of 0.5–30% by weight, based on the titanium dioxide pigment, of aluminum phosphate, and polycondensing at polyamide-forming temperature the ε-caprolactam with the titanium dioxide uniformly dispersed therein.

7. The process of claim 1 wherein the pigment is titanium dioxide.

8. The process of claim 1 wherein the pigment is carbon black.

9. The process of claim 1 wherein the pigment is a phthalocyanine dye pigment.

10. A process for preparation of delustered polyamide polymers which comprises dispersing titanium dioxide pigment in a monomeric composition comprising substantially equimolar quantities of an aliphatic dicarboxy acid having 6-10 carbons and terminal carboxy groups and an aliphatic diamine having 4-8 carbons and primary amino groups in the presence of 0.5-30% by weight, based on the pigment, of aluminum phosphate, and polymerizing the monomeric composition with the pigment and aluminum phosphate dispersed therein at polyamide-forming temperature and pressure.

11. A process for preparation of delustered polyamide polymers which comprises dispersing titanium dioxide pigment in a salt of an aliphatic dicarboxy acid having 6-10 carbons and terminal carboxy groups and an aliphatic diamine having 4-8 carbons and primary amino groups in the presence of 0.5-30% by weight, based on the pigment, of aluminum phosphate, and polymerizing the salt with the pigment and aluminum phosphate dispersed therein at polyamide-forming temperature and pressure.

References Cited in the file of this patent

UNITED STATES PATENTS

| | | |
|---|---|---|
| 2,178,382 | Wiegand | Oct. 31, 1939 |
| 2,187,050 | Patterson | Jan. 16, 1940 |
| 2,205,722 | Graves | June 25, 1940 |
| 2,341,759 | Catlin | Feb. 15, 1944 |